(12) United States Patent
Takeda

(10) Patent No.: US 6,582,645 B2
(45) Date of Patent: Jun. 24, 2003

(54) METHOD FOR PRODUCING CELLULOSE ACYLATE FILM

(75) Inventor: Akihiko Takeda, Hino (JP)

(73) Assignee: Konica Corporation, Tokyo (JP)

( * ) Notice: Subject to any disclaimer, the term of this patent is extended or adjusted under 35 U.S.C. 154(b) by 121 days.

(21) Appl. No.: 09/760,306

(22) Filed: Jan. 12, 2001

(65) Prior Publication Data

US 2001/0009312 A1 Jul. 26, 2001

(30) Foreign Application Priority Data

Jan. 18, 2000 (JP) ........................................ 2000-009002

(51) Int. Cl.[7] ........................... B29C 41/26; B29C 41/44
(52) U.S. Cl. ........................................ 264/207; 264/217
(58) Field of Search ................................. 264/207, 212, 264/216, 217, 39, 169

(56) References Cited

U.S. PATENT DOCUMENTS 5,188,788 A * 2/1993 Suzuki et al. ............... 264/216
5,529,737 A * 6/1996 Arrington et al. .......... 264/207
5,686,036 A * 11/1997 Arrington .................. 264/217

\* cited by examiner

Primary Examiner—Mathieu D. Vargot

(57) ABSTRACT

A method for producing a cellulose acylate film is disclosed. The method comprises the steps of, casting dope containing cellulose acylate on a surface of a metal support, peeling off a web formed by casting the dope from the metal support, contacting surface of the web which has been contacted with the surface of the metal support, with a first roller just after the peeling off of the web from the metal support surface, consequently, contacting the surface of the web which has been exposed to air on the metal support, with a second roller, and drying the peeled web.

14 Claims, 4 Drawing Sheets

METHOD FOR PRODUCING CELLULOSE ACYLATE FILM

FIELD OF THE INVENTION

This invention relates to a method for producing a cellulose acylate film by a solution-casting method.

BACKGROUND OF THE INVENTION

Cellulose acylate film is usually produced by a solution-casting method. By the solution-casting method, a solution of cellulose acylate, hereinafter referred to as a dope, is poured onto an endless metal support having a mirror plane through a die arranged upward the support so as to evaporate the solvent of the dope from the poured layer of the dope. The layer of the dope from which the solvent is evaporated is referred to as a web. The web, is peeled off from the metal support by a peeling roller when the remaining amount of the solvent is attained at a prescribed amount. Then the web is dried while the web is transported by a roller or a tenter to produce the cellulose acylate film.

In the solution-casting film producing method, the production was usually performed at a transportation speed of not more than 40 m/min. Recently, however, the demand for the cellulose acylate film is considerably increased. Accordingly, raising in the production speed or the transportation speed is strongly required to raise the supplying amount of the film.

However, it has been found that serious problems are raised on the surface structure and the flatness of the film. In the usual production performed with the transportation speed of not more than 40 m/min., the web has been peeled off in a state having a remaining solvent content of not more than 40%. It has been found by the inventors that the peeling ability of the web is considerably degraded when the remaining solvent content exceeds 40%, but improved again when the solvent content is increased over a certain value. It has been also found that the problem of peeling ability has related to not only the remaining solvent content but also some factors such as the difference between the temperature at the peeling time and that after the peeling and the surface properties of the roller to be firstly contacted to the web just after the peeling. This invention is attained based on such the knowledge.

The object of the invention is to provide a method for producing a cellulose acylate film by which the cellulose acylate film excellent in the flatness and the surface quality with a little curing, wrinkle, unevenness, and defect caused by pressure, can be produced even when the transportation speed is accelerated. The web can be easily peeled off from the metal support and the peeled web can be stably transported and dried by the method according to the invention.

SUMMARY OF THE INVENTION

The invention and embodiments are described below.

A method for producing a cellulose acylate film comprising the steps of casting dope containing cellulose acylate and solvent on a surface of a metal support, peeling off a web formed by casting the dope from the metal support, and drying the peeled web, wherein remaining content of the solvent in the web when the web is peeled off is within the range of from 70 to 120%, contacting surface of the web with a first roller just after the peeling off of the web from the metal support surface, consequently, surface temperature of the first roller Tr is controlled so that the relation of the Tr and the surface temperature of the metal support at the time of peeling Tb is (Tr−Tb)≦50° C., and surface roughness $R_{max}$ of the first roller is not more than 1.0 μm.

A method for producing a cellulose acylate film mentioned above wherein the web is contacted to the first roller within 5 seconds after peeled from the metal support.

A method for producing a cellulose acylate film mentioned above wherein transportation speed of the web is preferably within the range of from 40 m/min. to 120 m/min.

A method for producing a cellulose acylate film mentioned above wherein surface temperature of the first roller is gradually decreased from central portion to both end of the roller along longitudinal direction of the roller.

A method for producing a cellulose acylate film mentioned above wherein the web comes into contact with the first roller on the surface of the web which has been exposed to air on the metal support.

A method for producing a cellulose acylate film mentioned above wherein the web comes into contact with the first roller on the surface of the web which has been contacted with the metal support, and consequently a second roller on the surface of the web which has been exposed to air on the metal support.

A method for producing a cellulose acylate film mentioned above wherein diameter of the first roller is gradually decreased from both end to the central portion of the roller along the longitudinal direction of the roller.

A method for producing a cellulose acylate film mentioned above wherein diameter of the first roller is gradually increased from both end to the central portion of the roller along the longitudinal direction of the roller.

A method for producing a cellulose acylate film mentioned above wherein the first roller is a nipping roller.

A method for producing a cellulose acylate film mentioned above wherein each both edges of the web after peeling off from metal support comes contact with two rollers, so that the angles of the axis of each of the roller with the direction perpendicular to the transportation direction of the web are θ and (180°−θ'), respectively, and θ and θ' are each satisfy the condition of $θ>0°$ and $θ<90°$.

A method for producing a cellulose acylate film mentioned above wherein position of the first roller is varied so that the angle formed by the web with the metal support keeps constant at a point where the web is peeled off from the metal support.

A method for producing a cellulose acylate film mentioned above wherein position of the first roller is varied according to remaining solvent content or surface temperature of the web at the time of peeling of the web from the metal support.

A method for producing a cellulose acylate film mentioned above wherein air is blown with a flow rate of not less than 20 m/second to the surface of the web at side which has been contacted to the metal support after peeling off from the metal support.

A method for producing a cellulose acylate film mentioned above wherein the web comes into contact with the first roller and then a second roller, wrapping angle of the web with the first roller being varied by changing position of the second roller corresponding to content of remaining solvent or surface temperature of the web at a position where the web is peeled off from the metal support. In one of the embodiment, the diameter of the first roller is preferably decreased from both ends to the center of the roller.

In the other embodiment, the diameter of the second roller is preferably increased from both ends to the center of the roller.

A method for producing a cellulose acylate film by a solution-casting method comprising the steps of
    peeling off a web form a metal support,
    firstly passing the web between a pair of nipping rollers, and
    drying the web.

A method for producing a cellulose acylate film by a solution-casting method comprising the steps of
    peeling off a web from a metal support,
    touching two small rollers to each the both edges of the surface of the web, which has been contacted to the metal support, just after the peeling off of the web from the metal support surface, so that the angles of the axis of each of the roller with the surface of the web are θ and (180°−θ'), respectively, and θ and θ' are each satisfy the condition of θ>0° and θ'<90°, thereafter, contacting the surface of the web which has been exposed to air on the metal support, to the first roller, and
    drying the web.

A method for producing a cellulose acylate film by a solution-casting method comprising the steps of
    peeling off a web from a metal support,
    contacting the web to a first roller, the position of which is varied corresponding to the content of remaining solvent in the web at a time just after the web is peeled or the surface temperature of the web at the time of peeling, and
    drying the web.

A method for producing a cellulose acylate film by a solution-casting method comprising the steps of
    peeling off a web from a metal support,
    vertically blowing air at a speed of not less than 20 m/second onto the surface of the web, which has been contacted with the metal support, through a slit arranged at a position upward the web,
    contacting the face of the web which has been exposed to air on the metal support, to the first roller, and drying the web.

(8) The distribution in the across direction of the web of the flow rate of air vertically blown to the web through the slit is preferably gradually increased from the center to the both ends of the web.

A method for producing a cellulose acylate film by a solution-casting method comprising the steps of
    peeling off a web from a metal support,
    contacting the web to a first roller,
    then contacting the web to a second roller, and
    drying the web,
wherein the wrapping angle of the web to the first roller is varied corresponding to the content of solvent remaining in the web at the time of peeling by varying the position of the second roller.

The surface temperature of the surface of the first roller preferably has a distribution in which the temperature is gradually decreased from the central portion in the longitudinal direction of the roller to the both ends of the roller.

A method for producing a cellulose acylate film by a solution-casting method comprising the steps of
    peeling off a web from a metal support,
    contacting the web to a first roller, and
    drying the web,
    wherein the surface temperature of the first roller Tr is controlled so that the relation of the Tr and the surface temperature of the metal support at the time of peeling Tb is (Tr−Tb)≦50° C.

The surface temperature Tr of the roller preferably has a distribution in which the temperature is gradually decreased from the central portion in the longitude direction of the roller to the both ends of the roller.

In the method for producing a cellulose acylate film the surface roughness $R_{max}$ of the roller to which the web is firstly contacted in preferably $R_{max} \leq 1.0$ μm.

DETAILED DESCRIPTION OF THE INVENTION

Figure 1:
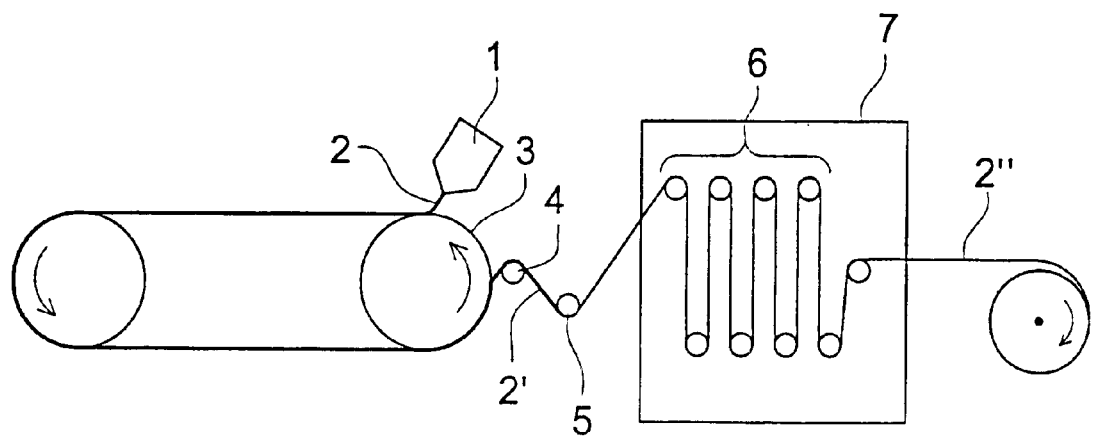
FIG. 1 is a schematic drawing of a solution-casting film producing apparatus.

The production method of cellulose acylate film according to the invention comprises a step of casting a dope containing cellulose acylate onto a metal support; a step of peeling off a cellulose acylate web formed by pouring the dope from the metal support; and a step of drying the peeled web.

The peeling ability of the web is considerably improved when the remaining content of the solvent in the web is within the range of from 70 to 120%. Furthermore, the peeling ability of the web and the surface property of the film are raised when the web is firstly contacted to the first roller just after peeled off form the metal support and the surface temperature Tr of the first roller and the surface temperature Tb of the metal support at the time of the peeling satisfy the equation of (Tr−Tb)≦50° C., and the surface roughness $R_{max}$ of the first roller is not more than 1.0 μm. The temperature can be controlled by adjusting the room temperature, jacket warming water roll, induction heating roll and so on.

The Tr can be measured by touching a touching type thermometer to the surface of the first roller and the Tb can be measured by touching a touching type thermometer to the surface of the metal support at the peeling position. When the temperature at the surface of the first roller or the surface of the metal support at the peeling position has a distribution, the temperature is measured ten points with about uniform interval in the direction perpendicular to the transportation direction and Tr and Tb are each defined by the average values thus obtained.

It is more preferable that the difference of temperature Tr–Tb be from 15 to 30° C. Tr is more preferably within the range of from 10° C. to 70° C.,and Tb is more preferably within the range of from 0° C. to 50° C.

The $R_{max}$ is measured by the method of measuring of "Ry" described in JIS B 0601-1994. Rmax is the difference from the deepest bottom to the highest peak in the predetermined range, for example, 25 mm, of the cross section curve, which is the outline of the cross section figure appeared when the film is cut along with a plane at right angle to the film plane. The remaining solvent content is described later. $R_{max}$ is preferably not more than 0.8 μm, more preferably not more than 0.3 μm.

It is preferable that the web is contacted to the first roller within 5 seconds, more preferably within 3 seconds, after peeled from the metal support. When the web is contacted to the second roller after contacting to the first roller, it is preferable to contact to the second roller within 5 seconds after contacting to the first roller.

The transportation speed of the web is preferably within the range of from 40 m/min. to 110 m/min., more preferably from 50 m/min. to 100 m/min.

The first roller may be either one to be contacted to the surface of the web opposite to the side which has been contacted with the metal support or one to be contacted to the side of the web which has been contacted to the metal support. When the first roller is a roller to be contacted to the surface of the web which has been contacted with the metal support, it is preferable that the second roller is a roller to be contacted to the surface of the web which is opposite to the surface which has been contacted with the metal support.

It is preferable to change the position of the first roller so that the angle formed by the web with the metal support is constant. For example, it is preferable to provide a tension measuring device and to change the position of the first roller according to the measuring result by the tension measuring device.

In another embodiment, it is allowed that the position of the first roller is changed according to the remaining solvent content or the surface temperature of the web at the time of peeling of the web from the metal support, or the wrapping angle of the web on the first roller is changed by changing the position of the second roller according to the remaining solvent content or the surface temperature of the web at the time of peeling of the web from the metal support. For example, the more the residual solvent content becomes, the lower the first roller preferably varied its position, and the less the residual solvent content becomes, the higher the first roller preferably varied its position.

The cellulose acylate relating to the invention is one derived by substituting hydroxy groups of cellulose by an acetyl groups, or a mixture of an acetyl group and a propionyl group, that of an acetyl group and a butyryl group, or that of an acetyl group, propionyl group and a butyryl group. The substitution degree of the acyl group to the whole hydroxy group of cellulose is preferably within the range of from 2.5 to 3.0. It is preferable in the mixture of the acyl group that the acetyl group accounts for not lee than 50% of the total substitution degree.

The dope relating to the invention is prepared by dissolving cellulose acylate by an organic solvent capable of dissolving the cellulose acylate. For example, methylene chloride, methyl acetate, acetone, 1,3-dioxolan, and 1,4-dioxane are preferably usable even though ones capable of dissolving the cellulose acylate can be used without any limitation. Casting at a high speed can be realized by additionally adding anther organic solvent such as an alcohol having from 1 to 4 carbon atoms or cyclohexane in an amount of from 1 to 30% by weight. An usual dissolving method under a pressure near the ordinary pressure, the dissolving methods described in Japanese Patent Publication Open to Public Inspection, hereinafter referred to as JP O.P.I., Nos. 9-95544, 9-95557, and 9-95538, and the high pressure dissolving method described in JP O.P.I. No. 11-21379, can be applied for dissolving cellulose acylate. Among them one capable of easily dissolving the cellulose acylate may be applied.

The solution-casting film producing method relating to the invention is described below according to FIG. 1. FIG. 1 is a schematic drawing a solution-casting film producing apparatus. A dope is satisfactorily filtered and defoamed according to necessity, and transported through a precise pump (not shown in the drawing) to a die 1. The die 1 may be either a coat hunger type die or a T-type die. The dope is poured through the die 1 onto a circulating endless metal belt support 3 having a polished mirror surface or a rotating metal drum support having a chromium plated smooth surface (not shown in the drawing) so as to form a dope layer 2 having a prescribed thickness. The dope layer 2 is heated from the air side and/or the metal support side to evaporate the solvent satisfactorily for forming a web 2' capable of being peeled off from the support in the period of one round of the support. The web 2' is peeled off from the support just before one round of the support. The web 2' is dried by exposing both sides thereof to air or air containing a large amount of nitrogen gas while the web is transported by a peeling roller 4, the roller firstly contacted to the web, and the second roller 5, and passed through drying device 7 having a group of rollers 6, or through a tenter (not shown in the drawing) in which the both edges of the web are clipped. The dried web 2' is winded up in a form of a film 2". Both of the drying device having the roller group 6 and the tenter may be used d for drying the web. The amount of the solvent remained in the film 2" at the time of finish of the drying is within the range of from 0.01 to 3.0% by weight and usually not more than 2.0% by weight.

The content of the remaining solvent is defined by the following equation:

$$\text{Remaining solvent content } (\%)=\{(M-N)/N\}\times 100$$

In the above, M is the weight of the web at an arbitrary time and N is the weight of the web after dried at 110° C. for 3 hours.

More preferable embodiments of the invention are described below according to the drawings.

Figure 2:
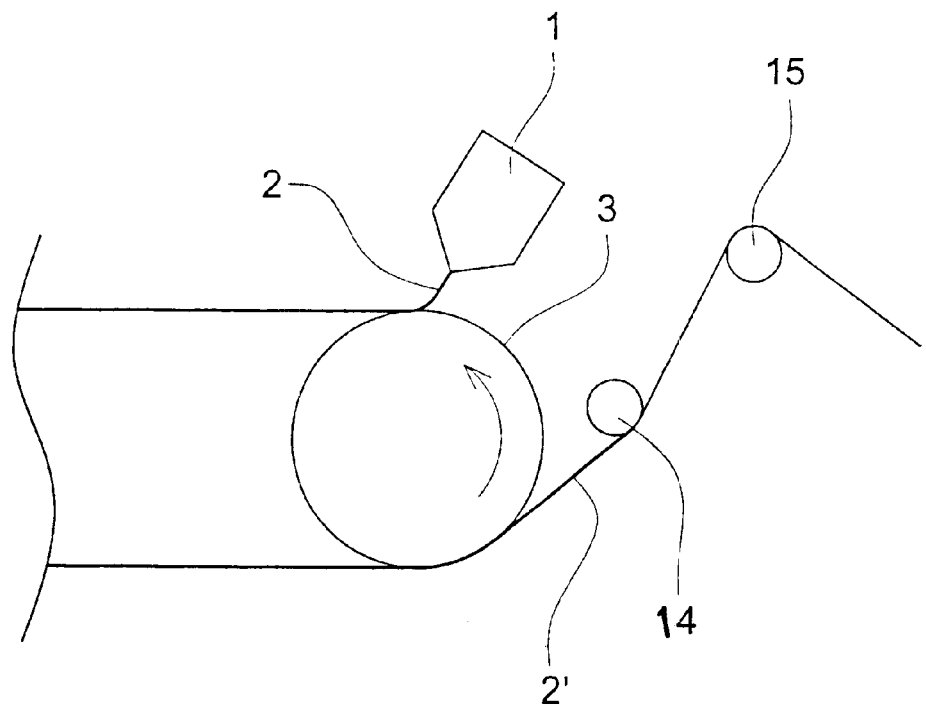
FIG. 2 is a schematic drawing of a part of a solution-casting film producing apparatus showing the relation between the first roller to be firstly contacted to the web and the second roller.
Figure 3:
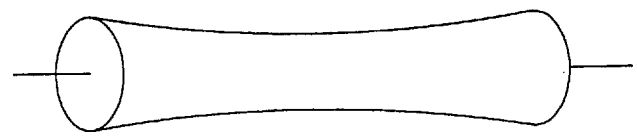
FIG. 3 is a sketch of the roller to be firstly contacted to the web, in which the diameter at the central portion in the longitudinal direction is smaller than the diameter at the both ends of the roller.
Figure 4:
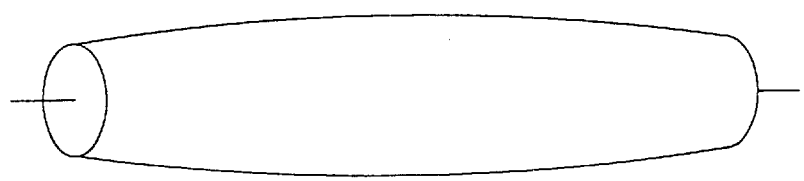
FIG. 4 is a sketch of the roller to be secondarily contacted to the web, in which the diameter at the central portion in the longitudinal direction is larger than the diameter at the both ends of the roller.

FIG. 2 is a schematic drawing of a part of a solution-casting film producing appratus showing the relation between the roller 14 to be firstly contacted with the web and the second roller 15. FIG. 3 shows a sketch of the first roller to be firstly contacted to the web, of which diameter at the central portion is smaller than that at the both ends thereof. FIG. 4 shows a sketch of the second roller to be secondary contacted to the web, of which diameter at the central portion is larger than that at the both ends thereof. The invention is characterized in that the surface of the web which has been contacted with the metal support is firstly contacted to the first roller 14 and the surface of the web which has been exposed to air on the metal support is secondary contacted to the roller 15. The first roller 14 is provided to stably perform the peeling.

Usually, the web 2' tends to curl at the both edges thereof to the metal support side after peeled off from the support, and is easily folded at the entrance of the next roller. Such the folding at the both edges of the peeled web can be prevented by the use of a roller such as that shown in FIG. 4 of which diameter is decreased from the both ends to the central portion thereof as the first roller 14 so as to stabilize the transportation of the web in the process hereafter. Moreover, the transportation of the web can be further stabilized by the use of a roller such as that shown in FIG. 4 of which diameter is increased from the both ends to the central portion of the roller as the second roller 15.

Figure 5:
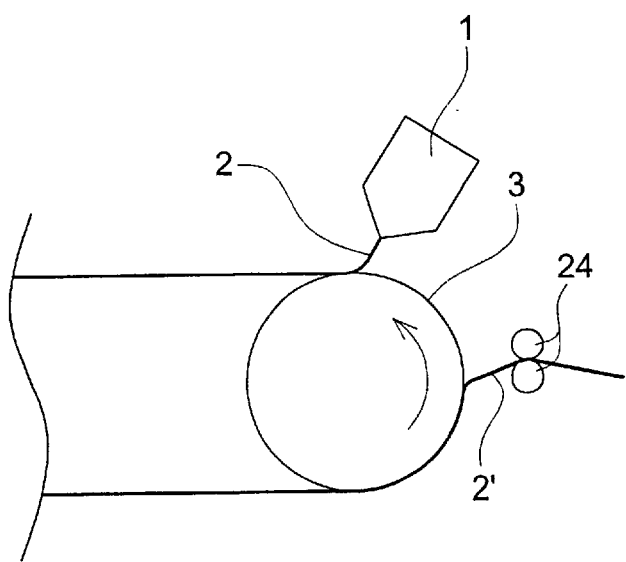
FIG. 5 is a schematic drawing of a part of a solution-casting film producing apparatus having a pair of nipping rollers as a peeling roller.

FIG. 5 is a schematic drawing of a part of a solution-casting film producing apparatus having a pair of nipping rollers as a peeling roller. The position at which the web 2' is peeled off from the support can be constant by the use of the pair of nipping rollers 24 as the roller to be firstly contacted to the web 2' just after the peeling thereof or the peeling roller. Thus a film having a high flatness without formation of an across unevenness caused by fluctuation of the peeling position can be produced. The pressure of the nipping roller is preferably within the range of from 1 to 100 kPa, more preferably from 1 to 50 kPa. The upper roller of the nipping rollers may be separate to two rollers having a length shorter than half of length of the lower roller to nip each of the both edges of the web, even though the upper roller has a length similar to that of the lower roller.

Figure 6:
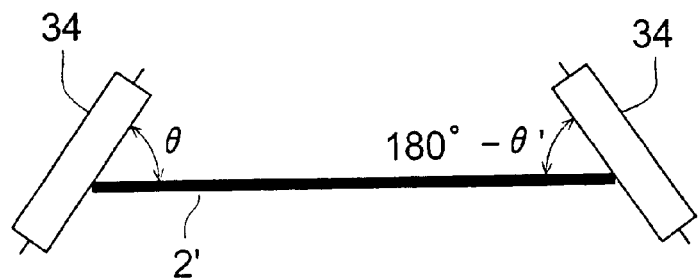
FIG. 6 is a schematic drawing of a part of a solution-casting film producing apparatus having two small rollers each forming angles θ and (180°−θ'), respectively.

FIG. 6 is a schematic drawing a solution-casting film producing apparatus having two small rollers each provided to form an angle of θ and (180°-θ') with the surface of the web 2'. In the apparatus, the two small rollers 34 which are each arranged so as to form an angle of θ and (180°-θ') with the surface of the web, respectively, are touched to both edges of the surface of the web which has been contacted with the surface of the metal support in the state as shown in the figure. The peeling position of the web is stabilized by the presence of the two small rollers. The two small rollers each may form any angle with the surface of the web. It is preferable that the web is contacted to the first roller (not shown in the drawing) on the opposite side to a side which has been contacted to the metal support (i.e., a side which has been exposed to air on the metal support) at a position as near as possible the position at which the small rollers are touch to the web. The peeling position can be stabilized by making the angle θ to 10 to 80° and θ' to 100 to 170°, preferably from 15 to 50° and from 130 to 165°, preferably.

The length of the small roller is preferably smaller than the width of the web, usually preferably from 500 mm to 600 mm. The diameter of the small roller is preferably from 80 to 200 mm.

Figure 7:
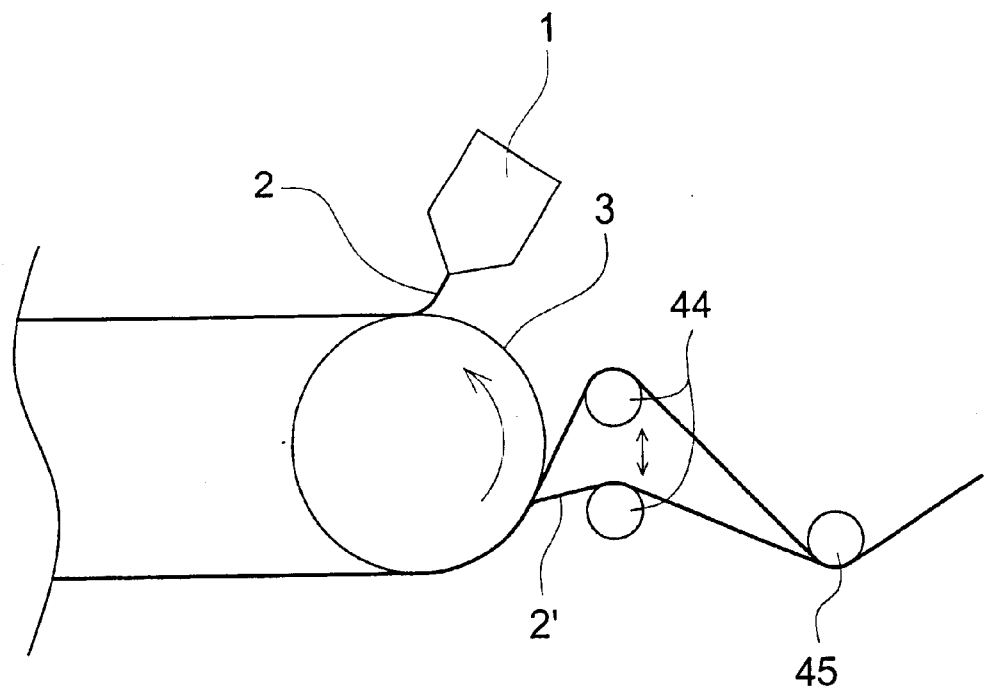
FIG. 7 is a schematic drawing of a part of a solution-casting film producing apparatus having a peeling roller capable of changing the position thereof.

FIG. 7 is a schematic drawing of a part of a solution-casting film producing apparatus having a peeling roller 44 which can be changed in the position thereof and a second roller 45. In the apparatus the position of the roller 44 to be firstly contacted to the surface of the web which has been exposed to air on the metal support can be changed correspondingly to the content of remaining solvent at the time of peeling or the surface temperature of the web at the time of peeling. Therefore, the film can be produced by a stable peeling condition by the change of the roller position even when the composition of the dope such as the kind of the solvent or the concentration of the dope, the casting speed or the drying condition is changed.

Another preferable embodiment of the invention is a film producing method by which air is vertically blown with a flow rate of not less than 20 m/second, preferably from 20 to 30 m/second onto the peeled web through a slit arranged upward the web (not shown in the drawing) at a position before the peeling roller. The blowing through the slit either may be applied to the whole wide of the web or only both of the edge portions of the web. It is also preferred that air blown through the slit is gradually increased at the central portion in the across direction of the web. Such the means is performed to compensate the difference of the amount of remained solvent between the portion of the web, usually the drying of the web is late some degree at the central portion of the web. By this means, the difference of the remaining solvent amount in the across direction of the web can be unitized as soon as possible. Any device can be used for blowing air as long as the device can uniformly blow air.

The air stream is not limited to the air blown through a slit, and the device to blow air is not limited to the slit or nozzle.

Figure 8:
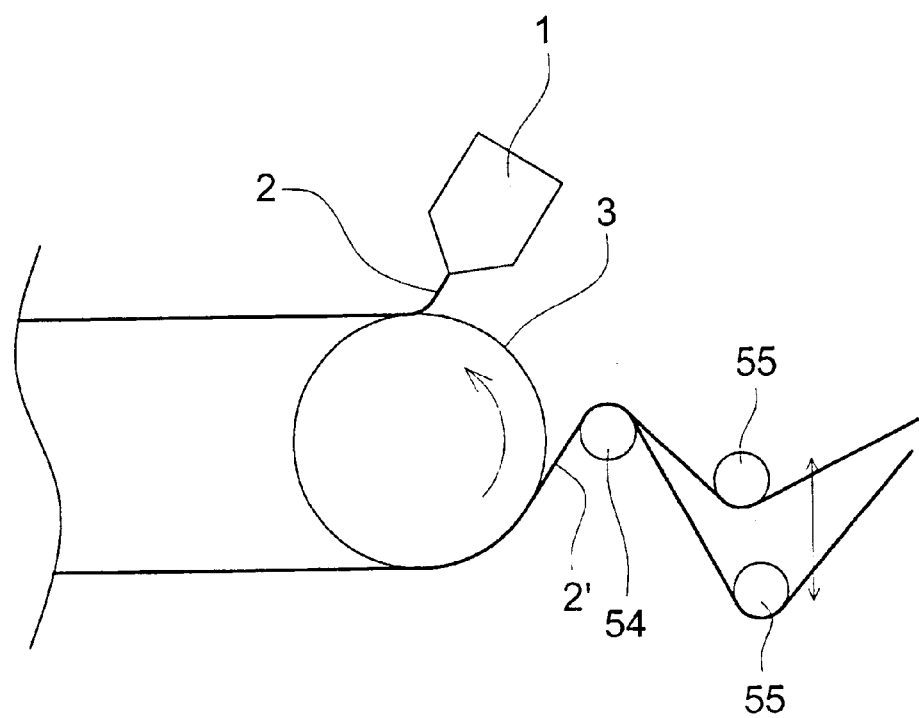
FIG. 8 is a schematic drawing of a part of a solution-casting film producing apparatus having a movable second roller.

FIG. 8 is a schematic drawing a part of a solution-casting film producing apparatus having a movable second roller. In the apparatus, the wrapping angle of the web 2' with the first roller 54 is changed corresponding to the content of remaining solvent by changing position of the second roller 55 to stabilize the peeling force. It is preferable that the first roller 54 is driven to further stabilize the peeling force. However, large torque cannot be applied to the web since the web containing a considerably high content of remaining solvent is very soft. Accordingly, the driven roller may be given a speed change of from 1.001 to 1.100. It is also preferable that the surface temperature of the first roller is gradually decreased from the central portion to the both end of the roller along the longitudinal direction of the roller.

The wrapping angle is an angle formed by the two lines each connecting the contacting points of the web to the roller and the central portion of the roller.

A film 2" excellent in the flatness can be produced by controlling surface temperature Tr of the roller 4 to which the web is firstly contacted as shown in FIG. 1 and the is Tr−Tb≦50° C. The contactness of the first roller 4 and the web 2' is raised and the peeling ability of the web is improved without degradation of the flatness under such the condition. The difference of the temperature Tr−Tb is preferably from 15 to 30° C. The flatness of the film can be further improved by giving a temperature distribution to the surface temperature Tr of the first roller in which the surface temperature Tr is gradually decreased from the central portion to the both end of the roller along the longitudinal direction of the roller. The difference of the temperature at the central portion of the roller and that at the end of the roller is preferably riot more than 15° C.

In another preferable embodiment of the invention, the flatness is further improved and the scratch caused by the slip of web 2' on the roller can be prevented by making the surface roughness Ra of the roller to be firstly contacted to the peeled web such as 4, 14, 24, and 44 in the drawings to $R_{max} \leq 1.0 \mu m$.

EXAMPLE

The invention is described below according to examples.

[Preparation of Dope and Production of Film]

In a dissolving vessel, 100 parts by weight of cellulose triacetate was dissolved in 400 parts by weight of methylene chloride, 80 parts by weight of ethanol, and 15 parts by weight of triphenyl phosphate by stirring for 5 hours. The solution was filtered by a filter press to prepare a dope. The dope was transported to a coat hunger die through a pressing quantitative pump and poured on a metal support to form a dope layer so that the dry thickness was 120 μm. The solvents were evaporated on the metal support. The web was peeled off when the content of remaining solvent reached at the prescribed value and dried at a temperature of from 80 to 130° C. Thus a film was prepared. In the following examples, the web peeled from the metal support was firstly contacted to the first roller, the surface roughness of the first roller $R_{max}$ was 1.0 μm, the remaining solvent content at the time of peeling the cellulose acylate web from the metal support was 100% (excepting Examples 6, 7, 10, and 11, and Comparative Example 1), the surface temperature of the first roller Tr was uniformly 30° C. and the surface temperature of the metal support Tb at the peeling of the web was uniformly 10° C. (excepting Comparative example 2).

[Evaluation Method]

<Peeling Ability>

A standard peeling point was set on the metal support and the fluctuation of the peeling point of the web from the metal support was measured and classified into six ranks according to the following norms. The remaining content of the solvent at the time of peeling was 100% by weight.

A: Fluctuation not more than was ±20 mm.

B: Fluctuation was more than 20 mm and not more than 35 mm.

C: Fluctuation was more than 35 mm and not more than 50 mm.

D: Fluctuation was more than 50 mm and not more than 75 mm.

E: Fluctuation was more than 75 mm and not more than 100 mm.

F: Fluctuation was more than 100 mm.

<Surface Quality of Film>

A film sample having a size of 1 m by whole width of the film was sampled from the dried film. The sample was laid on a flat table which was lighted by three fluorescent light tubes arranged in parallel upward the table at a height of 2 m. The state of the film surface was visually observed and classified in to the following ranks according to the state of the reflected image of the fluorescent light tubes on the sample surface.

A: The reflex image of the fluorescent light was straight and no wrinkle was observed.

B: The reflex image of the fluorescent light was almost straight and wrinkles were observed little.

C: The reflex image of the fluorescent light was slightly curved and wrinkles were observed a little.

D: The reflex image of the fluorescent light was partially curved and wrinkles were observed some degree.

E: The reflex image of the fluorescent light was zigzag in some degree and wrinkles were appeared.

F: The reflex image of the fluorescent light was irregular and many wrinkles were observed.

Comparative Example 1

As shown in FIG. 1, the surface of a web opposite to the surface which had been contacted with the metal support was contacted to the first roller as the peeling roller just after the peeling of the web, and transported and dried. The fluctuation of the peeling point was measured in the course of the film preparation, and the surface quality of the film was evaluated after the drying. The surface roughness of the first roller was 1.0 μm in $R_{max}$, and the content of the solvent remained in the web at the time of peeling the cellulose acylate web from the metal support was 50% by weight. The surface temperature Tr of the first roller and that Tb of the metal support at the time of peeling were each uniformly 30° C. and 10° C., respectively.

Comparative Example 2

A sample of film was prepared under the conditions of the surface roughness $R_{max}$ of the first roller was 1.0 μm, and the content of the solvent remained in the web at the time of peeling the cellulose acylate web from the metal support was 100% by weight. The surface temperature Tr of the first roller and that Tb of the metal support at the time of peeling were each uniformly 70° C. and 10° C., respectively. The conditions other than the above were the same as in Comparative example 1.

Example 1

A web having a remaining solvent content of 100% by weight was peeled from the metal support. The surface of the web which has been contacted with the surface of the metal support was contacted to the first roller. Then the web was contacted to the second roller so as to be transported, and dried in the drying device.

Example 2

A film was prepared in the same manner as in Example 1 except that the first roller was replaced by a roller which had a diameter smaller at the central portion thereof than that at the both ends of the roller.

Example 3

A film was prepared in the same manner as in Example 2 except that the first roller was replaced by a roller which had a diameter larger at the central portion thereof than that at the both ends of the roller.

Example 4

A web having a remaining solvent content of 100% was peeled and firstly contacted to a pair of nipping rollers as shown in FIG. 5 applying a nipping pressure of from 5 to 10 kPa, and transported by the nipping roller applying a nipping pressure of from 5 to 10 kPa and dried in the drying device.

Example 5

A web a remaining solvent content of 100% was peeled. Just after the peeling, two inclined small rollers each forming an angle θ of 20° and an angle θ' of 160° C. with the surface of the web were touched to the booth edges of the metal support side surface of the web. Just after that, the first roller was touched to the air side of the web surface to transport the web and the web was dried by a drying device.

Example 6

A web a remaining solvent content of 105% was peeled and contacted to the first roller arranged at the ordinary position. The web was transported and dried by a drying device.

Example 7

A film was prepared in the same manner as in Example 6 except that the remaining solvent amount in the web was 95% and the position of the first roller was moved upward by 100 mm.

Example 8

A web was peeled. Just after that, air was vertically blown uniformly through a slit at a flow rate of 20 m/second to the metal support side of the web. Then the air side of the web was contacted to the first roller. The web was transported and dried.

Example 9

A film was prepared in the same manner as in Example 8 except that the distribution of the air amount was changed so that the air amount was reduced by 5% from the central portion to the edge portion of the web.

Example 10

A web having a remaining solvent content of 105% was peeled from the metal support. Just after the peeling, the web was contacted to the first roller at a fixed position. Then the web was contacted to the second roller capable of being changed the position thereof so the wrapping angle of the web was 60°, and transported and dried.

Example 11

A film was prepared in the same manner as in Example 10 except that the remaining solvent content of the web was varied to 95% and the wrapping angle was changed to 78° by moving downward the position of the second roller by 100 mm.

Example 12

A film was prepared using the apparatus shown in FIG. 1.

Example 13

A film was prepared in the same manner as in Example 12 except that the roller was replaced by a roller having a surface temperature gradient so that the temperature at central portion in the longitudinal direction was 35° C. and the temperature at the both ends of the roller was 25° C.

Evaluation results of the foregoing Examples and Comparative examples are shown in table 1.

TABLE 1

| | Peeling ability | Surface quality | Remarks |
|---|---|---|---|
| Example 1 | A | A | |
| Example 2 | A | A | Curl at the edges is a little. |
| Example 3 | A | A | Curl at the edges is a little. |
| Example 4 | A | A | |
| Example 5 | A | A | |
| Example 6 | A | A | |
| Example 7 | A | A | |
| Example 8 | A | A | |
| Example 9 | A | A | Curl at the edges is a little. |
| Example 10 | A | A | |
| Example 11 | A | A | |
| Example 12 | A | A | |
| Example 13 | A | A | |
| Comparative Example 1 | E | E | |
| Comparative Example 2 | E | E | |

Results

As is shown in Table 1, the good results are obtained in the all examples each according to the various embodiments of the invention.

A method for producing a cellulose acylate film is provided by the invention, by which the cellulose acylate film excellent in the flatness and the surface quality with a little curing, wrinkle, unevenness, and defect caused by pressure can be produced even when the transportation speed is accelerated. The web can be easily peeled off from the metal support and the peeled web can be stably transported and dried by the method according to the invention.

What is claimed is:

1. A method for producing a cellulose acylate film comprising the steps of:
    casting a dope containing cellulose acylate and solvent on a surface of a metal support to form a web;
    peeling the web from the metal support,
        wherein the peeled web has a remaining solvent content from 70 to 120%, and the metal support has a surface temperature at time of peeling $T_b$;
    contacting a surface of the peeled web with a first roller wherein the first roller has a surface temperature Tr, which is controlled so that the relation of Tr and Tb is $(Tr-Tb) \leq 50°$ C., and the first roller has a surface roughness $R_{max}$ not more than 1.0 μm; and
    drying the peeled web.

2. A method for producing a cellulose acylate film of claim 1, wherein the peeled web contacts the first roller within seconds after being peeled from the metal support.

3. A method for producing a cellulose acylate film of claim 1, wherein the transportation speed of the web is from 40 m/min. to 120 m/min.

4. A method for producing a cellulose acylate film of claim 1, wherein the surface temperature of the first roller is gradually decreased from a central portion to both ends of the roller along longitudinal direction of the roller.

5. A method for producing a cellulose acylate film of claim 1, wherein the surface of the peeled web that comes into contact with the first roller had also been exposed to air on the metal support.

6. A method for producing a cellulose acylate film of claim 1, wherein the surface of
    the peeled web that comes into contact with the first roller had also been in contact with the metal support; and the method further comprising contacting the peeled web with a second roller on the other surface of the web.

7. A method for producing a cellulose acylate film of claim 6, wherein the diameter of the first roller is gradually decreased from both ends to the central portion of the roller along the longitudinal direction of the roller.

8. A method for producing a cellulose acylate film of claim 6, wherein the diameter of the first roller is gradually increased from both ends to the central portion of the roller along the longitudinal direction of the roller.

9. A method for producing a cellulose acylate film of claim 1 wherein the first roller is a nipping roller.

10. A method for producing a cellulose acylate film of claim 1, wherein each of both edges of the peeled web comes into contact with two rollers, and the angles of the axis of each of the two rollers with a direction perpendicular to the transportation direction of the peeled web are θ and (180°−θ'), respectively, and θ and θ' each satisfy the conditions of θ>0° and θ<90°.

11. A method for producing a cellulose acylate film of claim 1, wherein the position of the first roller is varied so that the angle formed by the web with the metal support keeps constant at a point where the web is peeled from the metal support.

12. A method for producing a cellulose acylate film of claim 1, wherein position of the first roller is varied according to the remaining solvent content or surface temperature of the web at the time of peeling of the web from the metal support.

13. A method for producing a cellulose acylate film of claim 1, wherein air is blown with a flow rate of not less than 20 m/second to the surface of the web which has been in contact with the metal support after peeling from the metal support.

14. A method for producing a cellulose acylate film of claim 1, wherein the web comes into contact with the first roller and then a second roller, the web forms a wrapping angle with the first roller and said wrapping angle is varied by changing the position of the second roller corresponding to the remaining solvent content or surface temperature of the web at a position where the web is peeled from the metal support.

* * * * *